United States Patent [19]

Matsushima et al.

[11] Patent Number: 5,936,042
[45] Date of Patent: Aug. 10, 1999

[54] PROCESS FOR PRODUCING AN AQUEOUS DISPERSION OF A WATER-SOLUBLE CATIONIC POLYMER

[75] Inventors: Shouji Matsushima, Ebina; Katsutoshi Kubo, Atsugi; Masayuki Murano, Sagamihara; Satoko Shimada, Zama, all of Japan

[73] Assignees: Kurita Water Industries Ltd.; Mitsubishi Chemical Corporation, both of Tokyo, Japan

[21] Appl. No.: 08/872,016

[22] Filed: Jun. 9, 1997

[30] Foreign Application Priority Data

Jun. 20, 1996 [JP] Japan .................................. 8-180153

[51] Int. Cl.$^6$ ...................................................... C08F 16/00
[52] U.S. Cl. ..................... 525/328.2; 525/328.4; 525/374
[58] Field of Search ............................. 525/328.2, 328.4, 525/374

[56] References Cited

U.S. PATENT DOCUMENTS 4,957,977  9/1990  Itagahi et al. ...................... 525/328.4
5,464,908  11/1995  Sato et al. ............................ 525/380

*Primary Examiner*—Edward J. Cain
*Attorney, Agent, or Firm*—Frishauf, Holtz, Goodman, Langer & Chick, P.C.

[57] ABSTRACT

A process for producing an aqueous dispersion of a water-soluble cationic polymer which process comprises modifying a polymer obtained by homopolymerization of an N-vinylcarboxylic acid amide or copolymerization of an N-vinylcarboxylic acid amide and a vinyl monomer copolymerizable with the N-vinyl carboxylic acid amide with an acid in an aqueous medium in the presence of a nitrate ion. The process can produce an aqueous dispersion of a water-soluble cationic polymer having a high molecular weight from the above water-insoluble polymer easily in a single step without causing adverse effects on the handling property while the fluidity is maintained.

19 Claims, No Drawings

PROCESS FOR PRODUCING AN AQUEOUS DISPERSION OF A WATER-SOLUBLE CATIONIC POLYMER

FIELD OF THE INVENTION

The present invention relates to a process for producing an aqueous dispersion of a water-soluble cationic polymer. More particularly, the present invention relates to a process for producing an aqueous dispersion of a water-soluble cationic polymer which shows excellent effects as a flocculant for waste water, a dewatering agent for sludge, and an additive for paper manufacturing, wherein the aqeous dispersion can keep a low viscosity even at a high concentration, shows excellent handling property which is advantageous for automation and labor saving, does not use an oil which is required in emulsion polymers of the water-in-oil type, does not scatter dusts which cause problems in powder polymers, and is excellent for improvement of the working environment.

PRIOR ART OF THE INVENTION

It has been known that a polymer having the unit of vinylamine which is obtained by hydrolysis of a polymer containing the unit of N-vinylformamide or N-vinylacetamide as the essential monomer component (Japanese Patent Publication No. Heisei 3(1991)-64200, Japanese Patent Publication No. Heisei 4(1992)-2320, Japanese Patent Application Laid-Open No. Showa 63(1988)-304, Japanese Patent Application Laid-Open No. Showa 63(1988)-165412, Japanese Patent Application Laid-Open No. Heisei 6(1994)-39208, Japanese Patent Application Laid-Open No. Heisei 6(1994)-65329, and Japanese Patent Application Laid-Open No. Heisei 6(1994)-65366) and a polymer having an amidine structure which is obtained by hydrolysis of a polymer containing the units of an N-vinylcarboxylic acid amide and acrylonitrile as the essential monomer components (Japanese Patent Application Laid-Open No. Heisei 5(1993)-192513) show an excellent property as a flocculating and dewatering agent for sludge and an additive for paper manufacturing.

In macromolecular flocculants such as those described above, the flocculation takes place by bonding two or more particles in water with the macromolecular substance by adsorption. Because a larger thickness of the layer for the adsorption is more advantageous for flocculation by the bonding by adsorption, a flocculant having a large molecular weight is generally required. Therefore, when the material polymer containing the unit of an N-vinylcarboxylic acid amide as the essential monomer component is soluble in water, an aqueous solution obtained by using the polymer becomes highly viscous to cause difficulty in the handling. For example, the aqueous solution cannot occasionally be transferred by a pump even at the concentration of 5% by weight. Moreover, uniform mixing is not easy when chemical materials are added to an aqueous solution of the material polymer and mixed together, and using a special stirrer or mixing for a long time is required. Particularly, because it is necessary for obtaining a dispersion of a cationic polymer having a high concentration that an aqueous solution of the material polymer have a high concentration, still more difficulty is caused in the handling, and gelation sometimes takes place.

It is known that a macromolecular flocculant made of a cationic polymer can be formed into an emulsion of the water-in-oil type to improve the handling property (Japanese Patent Application Laid-Open No. Heisei 5(1993)-117313, Japanese Patent Application Laid-Open No. Heisei 5(1993)-125109, and Japanese Patent Application Laid-Open No. Heisei 5(1993)-309208). By forming the cationic polymer into an emulsion of the water-in-oil type, the handling property is improved, and the labor saving is enabled. However, problems arise about smell and safety in the working because a mineral oil is used as the dispersant. The use of a mineral oil is not preferable either in view of the protection of the global environment.

SUMMARY OF THE INVENTION

Accordingly, the present invention has an object of providing a process which can produce an aqueous dispersion of a water-soluble cationic polymer having a high molecular weight obtained from a water-insoluble polymer obtained by homopolymerization of an N-vinylcarboxylic acid amide or copolymerization of an N-vinylcarboxylic acid amide and a vinyl monomer copolymerizable with the N-vinyl carboxylic acid amide easily in a single step without causing adverse effects on the handling property while the fluidity is maintained.

As the result of extensive studies conducted by the present inventors, it was discovered that an aqueous dispersion of a water-soluble cationic polymer can easily be obtained by modifying a water-insoluble polymer, such as a polymer obtained by homopolymerization of an N-vinylcarboxylic acid amide or copolymerization of an N-vinylcarboxylic acid amide and a vinyl monomer copolymerizable with the N-vinyl carboxylic acid amide, with an acid in an aqueous medium in the presence of a nitrate ion. The present invention has been completed on the basis of the discovery.

The present invention provides:

(1) A process for producing an aqueous dispersion of a water-soluble cationic polymer which process comprises modifying a polymer obtained by homopolymerization of an N-vinylcarboxylic acid amide or copolymerization of an N-vinylcarboxylic acid amide and a vinyl monomer copolymerizable with the N-vinylcarboxylic acid amide with an acid in an aqueous medium in the presence of a nitrate ion;

(2) A process described in (1), wherein the homopolymerization or the copolymerization is conducted in the presence of an inorganic salt;

(3) A process described in (1), wherein the homopolymerization or the copolymerization is conducted in the presence of a nonionic or cationic water-soluble polymer;

(4) A process described in (1), wherein the vinyl monomer copolymerizable with the N-vinylcarboxylic acid amide is acrylonitrile or methacrylonitrile;

(5) A process described in (3), wherein the nonionic or cationic water-soluble polymer is polyvinyl alcohol, polyethylene glycol, or polyethyleneimine;

(6) A process described in (1), wherein an inorganic salt is additionally present in the aqueous medium;

(7) A process described in (1), wherein a water-soluble polymer or a surfactant is additionally present in the aqueous medium;

(8) A process described in (4), wherein the ratio by mol of a unit of the N-vinylcarboxylic acid amide to a unit of acrylonitrile or methacrylonitrile in the polymer is 3:7 to 7:3;

(9) A process described in (1), wherein the N-vinylcarboxylic acid is N-vinylformamide;

(10) A process described in (1), wherein the acid is hydrochloric acid or nitric acid;

(11) A process described in (1), wherein an amount by mol of the acid is 0.5 to 5 times as much as an amount by mol of a unit of the N-vinylcarboxylic acid amide in the polymer;

(12) A process described in (1), wherein concentration of the nitrate ion in a reaction mixture for the modification is 3 to 40% by weight;

(13) A process described in (1), wherein concentration of the polymer is 5 to 50% by weight;

(14) A process described in (1), wherein the modification is conducted at a temperature of 40 to 100° C.;

(15) A process described in (1), wherein the modification is conducted in the presence of hydroxylamine;

(16) A process described in (1), wherein the modification is conducted in the presence of a lower alcohol; and

(17) A process described in (7), wherein concentration of the water-soluble polymer or the surfactant in a reaction mixture for the modification is 0.1 to 20% by weight.

DETAILED DESCRIPTION OF THE INVENTION

In the process of the present invention, a water-insoluble polymer obtained by homopolymerization of an N-vinylcarboxylic acid amide or copolymerization of an N-vinylcarboxylic acid amide and a vinyl monomer copolymerizable with the N-vinyl carboxylic acid amide is used. As the water-insoluble polymer, a water-insoluble polymer having the unit of an N-vinylcarboxylic acid amide and the unit of (meth)acrylonitrile is preferable. The ratio of the unit of an N-vinylcarboxylic acid amide to the unit of (meth) acrylonitrile is not particularly limited. It is preferred that the ratio by mol of the unit of an N-vinylcarboxylic acid amide to the unit of (meth)acrylonitrile is 3:7 to 7:3. In the process of the present invention, the unit of an N-vinylcarboxylic acid amide is converted to the unit of vinylamine by hydrolysis in the modification of the polymer with an acid. Moreover, when the unit of vinylamine is placed adjacent to the unit of (meth)acrylonitrile, an amidine structure is formed by the reaction of both units. When the ratio by mol of the unit of an N-vinylcarboxylic acid amide to the unit of (meth)acrylonitrile is less than 3:7, the amount of the unit of (meth)acrylonitrile which remains unreacted or is converted into the unit of (meth)acrylic acid by hydrolysis is increased. When the ratio by mol of the unit of an N-vinylcarboxylic acid amide to the unit of (meth)acrylonitrile is more than 7:3, an N-vinylcarboxylic acid amide having a large number of carbon atoms must be used for obtaining a water-insoluble polymer. This causes increase in the relative weight of the carboxylic acid which is removed by the hydrolysis and is not advantageous.

In the process of the present invention, examples of the N-vinylcarboxylic acid amide include N-vinylformamide, N-vinylacetamide, N-vinylpropionamide, and N-vinylbenzamide. Among these compounds, N-vinylformamide is preferable.

In the process of the present invention, examples of the water-insoluble polymer having the unit of an N-vinylcarboxylic acid amide include homopolymer of an N-vinylcarboxylic acid amide, copolymers of an N-vinylcarboxylic acid amide and another monomer like (meth)acrylonitrile, and copolymers of three or more types of monomer including an N-vinylcarboxylic acid amide, (meth)acrylonitrile, and other monomers which are copolymerizable with the N-vinylcarboxylic acid amide as well as with (meth)acrylonitrile. The other monomers which are copolymerizable with the N-vinylcarboxylic acid amide as well as with (meth)acrylonitrile is not particularly limited as long as the obtained copolymer is insoluble in water. Examples of such monomer include nonionic monomers, such as (meth)acrylamide, styrene, methyl (meth)acrylate, ethyl (meth)acrylate, vinyl acetate, N,N-dimethyl(meth) acrylamide, N,N-diethyl(meth)acrylamide, and N-vinylpyrrolidone; anionic monomers, such as (meth) acrylic acid, vinylsulfonic acid, 2-acrylamido-2-methylpropanesulfonic acid, styrenesulfonic acid, and alkali metal salts of these acids; and cationic monomers, such as tertiary salts and quaternary ammonium salts of dimethylaminoethyl (meth)acrylate and dimethylaminopropyl (meth)acrylamide.

In the polymer which is used in the present invention, the content of the unit of an N-vinylcarboxylic acid amide or the total content of the unit of an N-vinylcarboxylic acid amide and the unit of (meth)acrylonitrile in the whole structural units of the polymer is preferably 35% by mol or more in view of the obtained property when the aqueous dispersion produced by the process of the present invention is used as a macromolecular flocculant. However, the process of the present invention can be conducted without being restricted by the content of the unit of an N-vinylcarboxylic acid amide or the total content of the unit of an N-vinylcarboxylic acid amide and the unit of (meth)acrylonitrile in the whole structural units of the polymer, and a stable aqueous dispersion of a water-soluble cationic polymer can be obtained.

In the process of the present invention, the process of the polymerization for obtaining the water-insoluble polymer having the unit of an N-vinylcarboxylic acid amide is not particularly limited, and the emulsion polymerization or the suspension polymerization can suitably be selected in accordance with the solubility of the used monomers. In the process of the present invention, the emulsion polymerization or the suspension polymerization using water as the medium is advantageously conducted because the modification of the polymer having the unit of an N-vinylcarboxylic acid amide with an acid is conducted in an aqueous medium. When the N-vinylcarboxylic acid amide is soluble in water, the polymerization is conducted by using a water-soluble polymerization initiator, and optionally an emulsifier and a dispersant. The polymerization is thus allowed to proceed while the polymer precipitated by the polymerization is kept in an emulsified or suspended condition, and an aqueous dispersion containing the polymer in an emulsified or suspended condition can be obtained. As the water-soluble polymerization initiator, a conventional initiator, such as ammonium persulfate, potassium persulfate, and 2,2'-azobis(2-amidinopropane) dihydrochloride, can be used. Among the conventional initiators, azo compounds are particularly preferable. When the N-vinylcarboxylic acid amide is insoluble in water, an aqueous dispersion of the polymer can be obtained by the conventional emulsion polymerization in which a water-soluble polymerization initiator and an emulsifier are used or by the conventional suspension polymerization in which an oil-soluble polymerization initiator soluble in the monomers and a dispersant are used.

The polymerization is preferably conducted in the presence of an inorganic salt in order to lower the viscosity of the obtained polymer dispersion.

As the inorganic salt, sodium chloride, potassium chloride, magnesium chloride, calcium chloride, ammonium chloride, sodium sulfate, potassium sulfate, magnesium sulfate, calcium sulfate, ammonium sulfate, sodium hydrogensulfate, potassium hydrogensulfate, ammonium hydrogensulfate, sodium carbonate, sodium hydrogencarbonate, potassium hydrogencarbonate, and ammonium hydrogencarbonate can be used.

In the process of the present invention, the above aqueous dispersion of the polymer having the unit of an N-vinylcarboxylic acid amide can be used for the modification with an acid directly without additional treatments, after concentration or dilution of the aqueous dispersion, or after separation of the polymer followed by preparation of an aqueous dispersion from the separated polymer. The unit of an N-vinylcarboxylic acid amide is converted into the unit of vinylamine by the modification with an acid. When the unit of vinylamine is placed adjacent to the unit of (meth) acrylonitrile, an amidine structure is formed by the reaction of both units.

It is preferred that the polymer in the aqueous dispersion of the water-soluble cationic polymer produced by the process of the present invention has a high molecular weight when the polymer is used as a macromolecular flocculant. Therefore, it is also preferred that the polymer having the unit of an N-vinylcarboxylic acid amide which is used for the modification with an acid has a high molecular weight. However, the process of the present invention can be conducted without being restricted by the molecular weight of the polymer having the unit of an N-vinylcarboxylic acid amide, and a stable aqueous dispersion of a water-soluble cationic polymer can be obtained.

In the process of the present invention, the water-insoluble polymer having the unit of an N-vinylcarboxylic acid amide is modified with an acid in an aqueous medium in the presence of nitrate ion. The used acid is not particularly limited, and for example, hydrochloric acid, nitric acid, or acetic acid can be used. The used amount by mol of the acid is preferably 0.5 to 5 times, more preferably 1 to 3 times, as much as the amount by mol of the unit of the N-vinylcarboxylic acid amide in the polymer. When the amount by mol of the acid is less than 0.5 times as much as the amount by mol of the unit of the N-vinylcarboxylic acid amide in the polymer, the rate of the modification is slow, and there is the possibility that the modification does not proceed sufficiently. When the amount by mol of the acid is more than 5 times as much as the amount by mol of the unit of the N-vinylcarboxylic acid amide in the polymer, the used amount of the acid is much larger than the amount necessary for the modification and not economically preferable. The used amount of the acid can suitably be selected in accordance with the desired degree of the modification.

In the process of the present invention, the compound used as the source of nitrate ion present in the aqueous medium is not particularly limited. When nitric acid is used as the acid, nitric acid itself is the source of nitrate ion. A nitrate, such as sodium nitrate, potassium nitrate, calcium nitrate, and ammonium nitrate, can also be added as the source of nitrate ion. In the present invention, a nitrate is preferably used as the source of nitrate ion. A single type or two or more types of the source of nitrate ion can be used. The concentration of nitrate ion in the reaction mixture is preferably 3 to 40% by weight, more preferably 5 to 20% by weight. When the concentration of nitrate ion is less than 3% by weight, there is the possibility that the cationic polymer modified with the acid is dissolved into the aqueous medium, and the viscosity of the system is increased. When the concentration of nitrate ion in the reaction mixture is 40% by weight, the polymer modified with the acid is sufficiently dispersed in the aqueous medium, and a concentration of nitrate ion larger than 40% by weight is generally not necessary. The step in which the compound used as the source of nitrate ion is added is not particularly limited. For example, the compound may be added in the step of the polymerization of an N-vinylcarboxylic acid amide. However, the compound is preferably added in the step of the modification with an acid after the step of the polymerization.

An inorganic salt can be additionally present in the aqueous medium. As the inorganic salt, sodium chloride, potassium chloride, magnesium chloride, calcium chloride, ammonium chloride, sodium sulfate, potassium sulfate, magnesium sulfate, calcium sulfate, ammonium sulfate, sodium hydrogensulfate, potassium hydrogensulfate, ammonium hydrogensulfate, sodium carbonate, sodium hydrogencarbonate, potassium hydrogencarbonate, and ammonium hydrogencarbonate can be used.

In the process of the present invention, the concentration of the water-insoluble polymer having the unit of an N-vinylcarboxylic acid amide in the reaction mixture is preferably 5 to 50% by weight, more preferably 10 to 30% by weight. When the concentration of the water-insoluble polymer is less than 5% by weight, the concentration of the obtained aqueous dispersion of the water-soluble cationic polymer is decreased, and the concentration is not economically advantageous. When the concentration of the water-insoluble polymer is more than 50% by weight, there is the possibility that the uniform modification with an acid becomes difficult.

In the process of the present invention, the temperature of the modification with an acid is preferably 40 to 100° C., more preferably 50 to 90° C. When the temperature is lower than 40° C., the rate of reaction is slow, and there is the possibility that the modification with an acid does not proceed sufficiently. When the temperature is higher than 100° C., a pressure-resistant reactor is necessary to cause economic disadvantage, and there is the possibility that the control of the reaction becomes difficult.

In the process of the present invention, it is preferred that hydroxylamine is added to the reaction mixture for the modification with an acid. The gelation can be prevented by adding hydroxylamine.

In the process of the present invention, it is preferred that a lower alcohol, such as methanol, ethanol, and isopropanol, is added to the reaction mixture for the modification reaction with an acid. By adding a lower alcohol, carboxylic acids formed as the byproducts in the modification with an acid is converted to esters having a low boiling point and can easily be removed from the reaction system. The used amount by mol of the lower alcohol is preferably 1 to 3 times as much as the amount by mol of the unit of an N-vinylcarboxylic acid amide in the water-insoluble polymer.

In the process of the present invention, a water-soluble polymer, such as polyvinyl alcohol, polyethylene glycol, and polyethyleneimine, or a surfactant, such as a polyoxyethylene alkylphenyl ether, a polyoxyethylene-polyoxypropylene block copolymer, a polyoxyethylene-alkylamine, and an alkylamine, may be added to the aqueous medium as the dispersant. A single type or two or more types of the water-soluble polymer or the surfactant can be added. By the presence of the water-soluble polymer or the surfactant in the aqueous medium, the stability and the fluidity of the aqueous dispersion of the water-soluble cationic polymer can be increased. The concentration of the water-soluble polymer or the surfactant in the reaction mixture is preferably 0.1 to 20% by weight, more preferably 0.5 to 10% by weight. When the concentration of the water-soluble polymer or the surfactant in the reaction mixture is less than 0.1% by weight, the effect of the water-soluble polymer or the surfactant to increase the stability and the fluidity of the aqueous dispersion of a water-soluble cationic polymer is not remarkably exhibited. When the concentration of the water-soluble polymer or the surfactant in the reaction mixture is more than 20% by weight, the stability and the fluidity of the aqueous dispersion of a water-soluble cationic polymer is not increased to the degree expected from the concentration of the water-soluble polymer or the surfactant, and the concentration is not economically advantageous. The step in which the water-soluble polymer or the surfactant is added is not particularly limited. The water-soluble polymer or the surfactant may be added in the step of the polymerization of an N-vinylcarboxylic acid amide, or in the step of the modification with an acid after the step of the polymerization.

In accordance with the process of the present invention, the water-insoluble polymer having the unit of an N-vinylcarboxylic acid amide is modified with an acid to form a water-soluble cationic polymer. Then, dissolution of the obtained water-soluble cationic polymer into the aqueous medium is suppressed by the nitrate ion in the aqueous medium, and the water-soluble cationic polymer formed by the modification with an acid is held in the form of dispersed particles. Therefore, an aqueous dispersion of the water-soluble cationic polymer can be obtained in a high concentration while the viscosity is held low.

To summarize the advantages of the present invention, the viscosity is always held low to provide an excellent handling property in the process of production, the uniform mixing can be conducted easily to enable the modification with an acid in a short time, and a uniform low viscosity aqueous dispersion of a water-soluble cationic polymer can be obtained even at a high concentration.

When the water-soluble cationic polymer dispersion prepared by the process of the present invention is diluted ten times or more, preferably around a hundred times, with water, the polymer dispersed in the aqueous medium can be easily dissolved to make into a uniform aqueous solution without gelation. Then, the solution is added waste water, sludge, or a raw material for manufacturing papers. The upper limit of the amount of water for diluting the dispersion is not limited but sufficient for dissolving the polymer into an aqueous medium.

EXAMPLES

The present invention is described in more detail with reference to examples in the following. However, the present invention is not limited by the examples.

Preparation Example 1

A Copolymer of N-vinylformamide and Acrylonitrile

Into a 2,000 ml flask equipped with a stirrer, a reflux condenser, a thermometer, and an inlet for nitrogen, 240 g (3.4 mol) of N-vinylformamide, 180 g (3.4 mol) of acrylonitrile, 960 g of water, and 20 g of ammonium chloride were placed, and the flask was purged with nitrogen. The resultant mixture was heated to 60° C. while being stirred, and 4.0 g of a 10% by weight aqueous solution of 2,2'-azobis(2-amidinopropane) dihydrochloride was added. The obtained mixture was kept at 60° C. to allow the polymerization to proceed for 6 hours, and an aqueous dispersion which contained particles of a copolymer having a diameter of several millimeters and had a viscosity of 900 mPa.s was obtained.

Preparation Example 2

A Copolymer of N-vinylformamide and Acrylonitrile

Polymerization was conducted in accordance with the same procedures as those conducted in Preparation Example 1 except that 940 g of water was used, and 20 g of a surfactant of the Pluronic type (NEWPOL PE108, a product of SANYO KASEI Co., Ltd.) was additionally used, and an aqueous dispersion which contained particles of a copolymer having a diameter of 5 to 10 µm and had a viscosity of 1,500 mPa.s was obtained.

Preparation Example 3

Poly-N-vinylformamide

Into a 1,000 ml flask equipped with a stirrer, a reflux condenser, a thermometer, and an inlet for nitrogen, 200 g (2.8 mol) of N-vinylformamide and 800 g of water were placed, and the flask was purged with nitrogen. The resultant mixture was heated to 60° C. while being stirred, and 3.0 g of a 10% by weight aqueous solution of 2,2'-azobis(2-amidinopropane) dihydrochloride was added. The obtained mixture was kept at 60° C. to allow the polymerization to proceed for 6 hours. The obtained viscous aqueous solution of a polymer was added to acetone, and the precipitated polymer was dried in a vacuum to obtain poly-N-vinyformamide as a white powder.

Example 1

Into a 500 ml separable flask equipped with a stirrer and a reflux condenser, 55 g of the aqueous dispersion obtained in Preparation Example 1 in the form of a white slurry was placed with weighing, and 1.0 g of hydroxylamine hydrochloride was added to the aqueous dispersion. The resultant mixture was kept at 50° C. for 1 hour while being stirred. Then, a mixture of 10 g of sodium nitrate, 20.7 g (1.5 times as much as the amount by mol of the unit of N-vinylformamide) of 35% by weight hydrochloric acid, 8.5 g (2.0 times as much as the amount by mol of the unit of N-vinylformamide) of methanol, and 4.8 g of water was added to the above mixture, and the obtained reaction mixture was kept being stirred at 70° C. for 6 hours. After the condenser was removed, the reaction mixture was kept at 70° C. for 1 hour, and formed methyl formate and methanol in the excess amount were removed by distillation to obtain a white uniform aqueous dispersion. During the above procedures, the polymer which was insoluble in water before the hydrolysis was dissolved in water as the hydrolysis proceeded and subsequently precipitated again as the hydrolysis further proceeded. Finally, a turbid uniform aqueous dispersion was obtained. The viscosity of the obtained aqueous dispersion was 7,300 mPa.s.

Example 2

The same procedures as those conducted in Example 1 were conducted except that a mixture of 20 g of calcium nitrate, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1. A uniform white aqueous dispersion was obtained, and the viscosity of the dispersion was 9,200 mPa.s.

Example 3

Into a 500 ml separable flask equipped with a stirrer and a reflux condenser, 55 g of the aqueous dispersion obtained in Preparation Example 1 in the form of a white slurry was placed with weighing, and 1.0 g of hydroxylamine hydrochloride was added to the aqueous dispersion. The resultant mixture was kept at 50° C. for 1 hour while being stirred. Then, a mixture of 20.9 g (1.5 times as much as the amount by mol of the unit of N-vinylformamide) of 60% by weight nitric acid, 8.5 g (2.0 times as much as the amount by mol of the unit of N-vinylformamide) of methanol, and 14.6 g of water was added to the above mixture, and the obtained reaction mixture was kept being stirred at 70° C. for 6 hours. After the condenser was removed, the reaction mixture was kept at 70° C. for 1 hour, and formed methyl formate and methanol in the excess amount were removed by distillation to obtain a white uniform aqueous dispersion. The viscosity of the obtained aqueous dispersion was 5,500 mPa.s.

Example 4

The same procedures as those conducted in Example 3 were conducted except that a mixture of 5 g of sodium nitrate, 14.0 g (1.0 times as much as the amount by mol of the unit of N-vinylformamide) of 60% by weight nitric acid, 8.5 g (2.0 times as much as the amount by mol of the unit of N-vinylformamide) of methanol, and 16.5 g of water was used in place of the mixture of 20.9 g of 60% by weight nitric acid, 8.5 g of methanol, and 14.6 g of water used in Example 3. A uniform white aqueous dispersion was obtained, and the viscosity of the dispersion was 4,700 mPa.s.

Example 5

The same procedures as those conducted in Example 1 were conducted except that a mixture of 10 g of polyvinyl alcohol, 10 g of sodium nitrate, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1.

A uniform white aqueous dispersion was obtained, and the viscosity of the dispersion was 1,300 mPa.s. This dispersion showed no change in the dispersed condition after the dispersion had been left standing at 40° C. for 3 months and thus had an excellent storage stability.

Example 6

The same procedures as those conducted in Example 1 were conducted except that a mixture of 10 g of polyethylene glycol, 10 g of sodium nitrate, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1.

A uniform white aqueous dispersion was obtained, and the viscosity of the dispersion was 1,300 mPa.s. This dispersion showed no change in the dispersed condition after the dispersion had been left standing at 40° C. for 3 months and thus had an excellent storage stability.

Example 7

The same procedures as those conducted in Example 1 were conducted except that a mixture of 10 g of a surfactant of the Pluronic type (NEWPOL PE108, a product of SANYO KASEI Co., Ltd.), 10 g of sodium nitrate, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1.

A uniform white aqueous dispersion was obtained, and the viscosity of the dispersion was 900 mPa.s. This dispersion showed no change in the dispersed condition after the dispersion had been left standing at 40° C. for 3 months and thus had an excellent storage stability.

Example 8

The same procedures as those conducted in Example 1 were conducted except that the aqueous dispersion obtained in Preparation Example 2 in the form of a white slurry was used in place of the aqueous dispersion obtained in Preparation Example 1 in the form of a white slurry which was used in Example 1.

A uniform white aqueous dispersion was obtained, and the viscosity of the dispersion was 2,300 mPa.s. This dispersion showed no change in the dispersed condition after the dispersion had been left standing at 40° C. for 3 months and thus had an excellent storage stability.

Example 9

The same procedures as those conducted in Example 5 were conducted except that the aqueous dispersion obtained in Preparation Example 2 in the form of a white slurry was used in place of the aqueous dispersion obtained in Preparation Example 1 in the form of a white slurry which was used in Example 5.

A uniform white aqueous dispersion was obtained, and the viscosity of the dispersion was 800 mPa.s. This dispersion showed no change in the dispersed condition after the dispersion had been left standing at 40° C. for 3 months and thus had an excellent storage stability.

Example 10

Into a 500 ml separable flask equipped with a stirrer and a reflux condenser, 16.5 g of poly-N-vinylformamide obtained in Preparation Example 3 and 40 g of water were placed with weighing, and 1.0 g of hydroxylamine hydrochloride was added to the obtained mixture. The resultant mixture was kept at 50° C. for 10 hours while being stirred to dissolve the polymer into a uniform solution. The obtained solution of the polymer had the viscosity of 9,500 mPa.s and could be handled in an ordinary manner. Then, a mixture of 10 g of sodium nitrate, 16.9 g (0.7 times as much as the amount by mol of the unit of N-vinylformamide) of 35% by weight hydrochloric acid, 14.8 g (2.0 times as much as the amount by mol of the unit of N-vinylformamide) of methanol, and 10 g of polyvinyl alcohol was added to the above mixture, and the obtained reaction mixture was kept being stirred at 70° C. for 6 hours. After the condenser was removed, the reaction mixture was kept at 70° C. for 1 hour, and formed methyl formate and methanol in the excess amount were removed by distillation to obtain a homogenous white aqueous dispersion. The obtained aqueous dispersion had the viscosity of 4,700 mPa.s.

Comparative Example 1

The hydrolysis was conducted under the condition that nitrate ion was absent. The same procedures as those conducted in Example 1 were conducted except that a mixture of 20.7 g of 35% by weight hydrochloric acid, 8.5 g of methanol, and 14.8 g of water was used in place of the mixture of 10 g of sodium nitrate, 20.7 g of 35% by weight hydrochloric acid, 8.5 g of methanol, and 4.8 g of water used in Example 1.

As the reaction proceeded, the reaction system gradually became transparent, and the viscosity increased. A gelled material having a viscosity as high as 10,000 mPa.s or more was obtained as the final product.

Comparative Example 2

The hydrolysis was conducted under the condition that nitrate ion was absent. Into a 500 ml separable flask equipped with a stirrer and a reflux condenser, 55 g of the aqueous dispersion obtained in Preparation Example 2 in the form of a white slurry was placed with weighing, and 1.0 g of hydroxylamine hydrochloride was added to the aqueous dispersion. The resultant mixture was kept at 50° C. for 1 hour while being stirred. Then, a mixture of 20.7 g (1.5 times as much as the amount by mol of the unit of N-vinylformamide) of 35% by weight hydrochloric acid, 8.5 g (2.0 times as much as the amount by mol of the unit of N-vinylformamide) of methanol, and 14.8 g of water was added to the above mixture, and the obtained reaction mixture was kept being stirred at 70° C. for 6 hours. As the reaction proceeded, the reaction system gradually became transparent, and the viscosity increased. After the condenser was removed, the reaction mixture was kept at 70° C. for 1 hour, and formed methyl formate and methanol in the excess amount were removed by distillation. A gelled material having a viscosity as high as 10,000 mPa.s or more was obtained as the final product.

Comparative Example 3

The hydrolysis was conducted under the condition that nitrate ion was absent. The same procedures as those conducted in Example 1 were conducted except that a mixture of 10 g of polyvinyl alcohol, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1.

As the reaction proceeded, the reaction system gradually became transparent, and the viscosity increased. A gelled material having a viscosity as high as 10,000 mPa.s or more was obtained as the final product.

Comparative Example 4

The hydrolysis was conducted under the condition that nitrate ion was absent and chlorine ion was present. The same procedures as those conducted in Example 1 were conducted except that a mixture of 10 g of sodium chloride, 20.7 g of 35% by weight hydrochloric acid, 8.5 g of methanol, and 4.8 g of water was used in place of the mixture of 10 g of sodium nitrate, 20.7 g of 35% by weight hydrochloric acid, 8.5 g of methanol, and 4.8 g of water used in Example 1.

As the reaction proceeded, the reaction system gradually became transparent, and the viscosity increased. A gelled material having a viscosity as high as 10,000 mPa.s or more was obtained as the final product.

The results obtained in Examples 1 to 10 are shown in Table 1, and the results obtained in Comparative Examples 1 to 4 are shown in Table 2.

TABLE 1-1

| | | acid | | nitrate | | dispersant | |
|---|---|---|---|---|---|---|---|
| | polymer | type | amount (eq/NVF) | type | amount (g) | type | amount (g) |
| Example 1 | Preparation Example 1 | HCl | 1.5 | NaNO₃ | 10 | — | — |
| Example 2 | Preparation Example 1 | HCl | 1.5 | Ca(NO₃)₂ | 20 | — | — |
| Example 3 | Preparation Example 1 | HNO₃ | 1.5 | — | — | — | — |
| Example 4 | Preparation Example 1 | HNO₃ | 1.0 | NaNO₃ | 5 | — | — |
| Example 5 | Preparation Example 1 | HCl | 1.5 | NaNO₃ | 10 | PVA | 10 |
| Example 6 | Preparation Example 1 | HCl | 1.5 | NaNO₃ | 10 | PEG | 10 |
| Example 7 | Preparation Exatnple 1 | HCl | 1.5 | NaNO₃ | 10 | Pluronic | 10 |
| Example 8 | Preparation Example 2 | HCl | 1.5 | NaNO₃ | 10 | — | — |
| Example 9 | Preparation Example 2 | HCl | 1.5 | NaNO₃ | 10 | PVA | 10 |
| Example 10 | Preparation Example 3 | HCl | 1.5 | NaNO₃ | 10 | PVA | 10 |

TABLE 1 - 2

| | | product | |
|---|---|---|---|
| | handling in production | property | viscosity (mPa · s) |
| Example 1 | good | turbid white uniformly dispersed | 7300 |
| Example 2 | good | turbid white uniformly dispersed | 9200 |
| Example 3 | good | turbid white uniformly dispersed | 5500 |
| Example 4 | good | turbid white uniformly dispersed | 4700 |
| Example 5 | good | turbid white uniformity dispersed | 1300 |

TABLE 1 - 2-continued

| | handling in production | product property | viscosity (mPa · s) |
|---|---|---|---|
| Example 6 | good | good storage stability turbid white uniformly dispersed | 1200 |
| Example 7 | good | good storage stability turbid white uniformly dispersed | 900 |
| Example 8 | good | good storage stability turbid white uniformly dispersed | 2300 |
| Example 9 | good | good storage stability turbid white uniformly dispersed | 800 |
| Example 10 | ordinary | good storage stability turbid white uniformly dispersed | 4700 |

Notes:
eq/NVF: ratio by mol relative to the unit of N-vinylformamide
PVA: polyvinyl alcohol
PEG: polyethylene glycol
Pluronic: NEWPOL PE108, a product of SANYO KASEI Co., Ltd.

Table 2 - 1

| | | | acid | | nitrate | | dispersant | |
|---|---|---|---|---|---|---|---|---|
| | polymer | type | amount (eq/NVF) | type | amount (g) | type | amount (g) | |
| Comparative Example 1 | Preparation Example 1 | HCl | 1.5 | — | — | — | — | |
| Comparative Example 2 | Preparation Example 2 | HCl | 1.5 | — | — | — | — | |
| Comparative Example 3 | Preparation Example 1 | HCl | 1.5 | — | — | PVA | 10 | |
| Comparative Example 4 | Preparation Example 1 | HCl | 1.5 | NaCl | 10 | — | — | |

TABLE 2 - 2

| | handling in production | product property | viscosity (mPa · s) |
|---|---|---|---|
| Comparative Example 1 | poor | high viscosity, gelled | — |
| Comparative Example 2 | poor | high viscosity, gelled | — |
| Comparative Example 3 | poor | high viscosity, gelled | — |
| Comparative Example 4 | poor | high viscosity, gelled | — |

Notes:
eq/NVF: ratio by mol relative to the unit of N-vinylformamide
PVA: polyvinyl alcohol It can be understood from the results shown in Table 1 that the aqueous dispersions of a water-soluble cationic polymer which were uniform and showed the excellent handling property in the production could be obtained in accordance with the process of the present invention. The aqueous dispersions of a water-soluble cationic polymer which were obtained in Examples 5, 6, 7, and 9 by the modification with an acid in the presence of a water-soluble polymer or a surfactant had low viscosities and showed the excellent storage stability. The aqueous dispersions of a water-soluble cationic polymer which were obtained in Examples 8 and 9 by using the copolymer of N-vinylformamide and acrylonitrile prepared by the emulsion polymerization had low viscosities and showed the excellent storage stability. It can be understood from these results that the presence of a water-soluble polymer or a surfactant is effective for decreasing the viscosity and increasing the storage stability of the aqueous dispersion of a water-soluble cationic polymer. When a homopolymer of N-vinylformamide was used in place of the polymer of N-vinylformamide and acrylonitrile as shown in Example 10, a uniform aqueous dispersion of a water-soluble cationic polymer could be obtained.

In contrast, a desirable result could not be obtained when the modification with an acid was conducted in the absence of nitrate ion. Aqueous dispersions could not be obtained but gelled materials having a high viscosity were obtained as shown by the results obtained in Comparative Example 1 and 2. A gelled material was obtained although polyvinyl alcohol was added as shown by the result obtained in Comparative Example 3. A gelled material was obtained by the modification with an acid in the presence of chlorine ion in place of nitrate ion as shown by the results obtained in Comparative Example 4. Thus, it can be understood that conducting the modification with an acid in the presence of nitrate ion is essential in order to obtain a uniform aqueous dispersion.

What is claimed is:

1. A process for producing an aqueous dispersion of a water-soluble cationic polymer which process comprises modifying a polymer obtained by homopolymerization of an N-vinylcarboxylic acid amide or copolymerization of an N-vinylcarboxylic acid amide and a vinyl monomer copolymerizable with the N-vinylcarboxylic acid amide by reaction with an acid in an aqueous medium in the presence of 3 to 40% by weight, based on the reaction mixture, of nitrate ion to produce an aqueous dispersion.

2. A process according to claim 1, wherein the homopolymerization or the copolymerization is conducted in the presence of an inorganic salt.

3. A process according to claim 1, wherein the homopolymerization or the copolymerization is conducted in the presence of a nonionic or cationic water-soluble polymer.

4. A process according to claim 1, wherein the vinyl monomer copolymerizable with the N-vinylcarboxylic acid amide is acrylonitrile or methacrylonitrile.

5. A process according to claim 3, wherein the nonionic or cationic water-soluble polymer is polyvinyl alcohol, polyethylene glycol, or polyethyleneimine.

6. A process according to claim 1, wherein an inorganic salt is additionally present in the aqueous medium.

7. A process according to claim 1, wherein a water-soluble polymer or a surfactant is additionally present in the aqueous medium.

8. A process according to claim 4, wherein ratio by mol of a unit of the N-vinylcarboxylic acid amide to a unit of acrylonitrile or methacrylonitrile in the polymer is 3:7 to 7:3.

9. A process according to claim 1, wherein the N-vinylcarboxylic acid amide is N-vinylformamide.

10. A process according to claim 1, wherein the acid is hydrochloric acid or nitric acid.

11. A process according to claim 1, wherein an amount by mol of the acid is 0.5 to 5 times as much as an amount by mol of a unit of the N-vinylcarboxylic acid amide in the polymer.

12. A process according to claim 1, wherein concentration of the polymer is 5 to 50% by weight.

13. A process according to claim 1, wherein the modification is conducted at a temperature of 40 to 100° C.

14. A process according to claim 1, wherein the modification is conducted in the presence of hydroxylamine.

15. A process according to claim 1, wherein the modification is conducted in the presence of a lower alcohol.

16. A process according to claim 7, wherein concentration of the water-soluble polymer or the surfactant in a reaction mixture for the modification is 0.1 to 20% by weight.

17. A process according to claim 8, wherein the acid is hydrochloric acid or nitric acid;

an amount by mol of the acid is 0.5 to 5 times as much as an amount by mol of a unit of the N-vinylcarboxylic acid amide in the polymer;

the concentration of the polymer is 5 to 50% by weight; and the modification is conducted at a temperature of 40° C. to 100° C.

18. A process according to claim 17, wherein the N-vinylcarboxylic acid amide is N-vinylformamide.

19. A process according to claim 1, wherein the acid is nitric acid which also supplies the nitrate ion.

\* \* \* \* \*